Nov. 6, 1945.   P. P. HICKS   2,388,411
TRACTOR RAKE
Filed Nov. 29, 1943    4 Sheets-Sheet 2
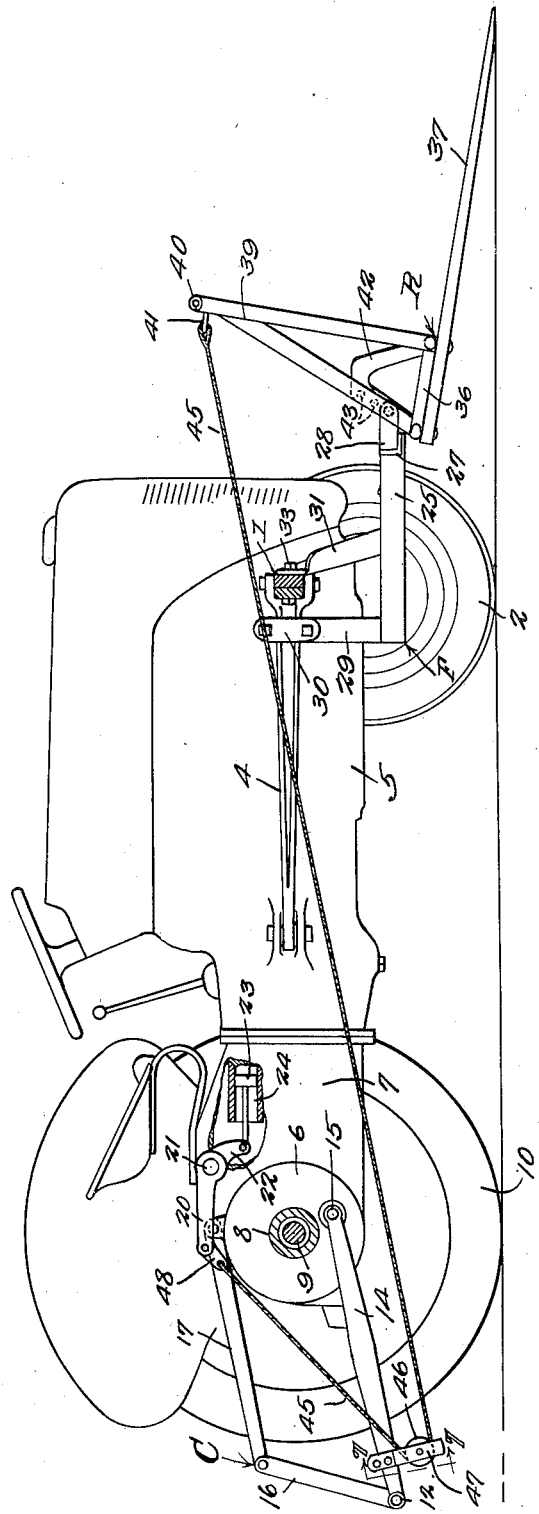
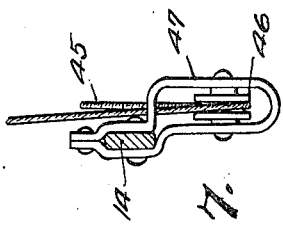
P. P. Hicks
INVENTOR.
BY
ATTORNEYS.

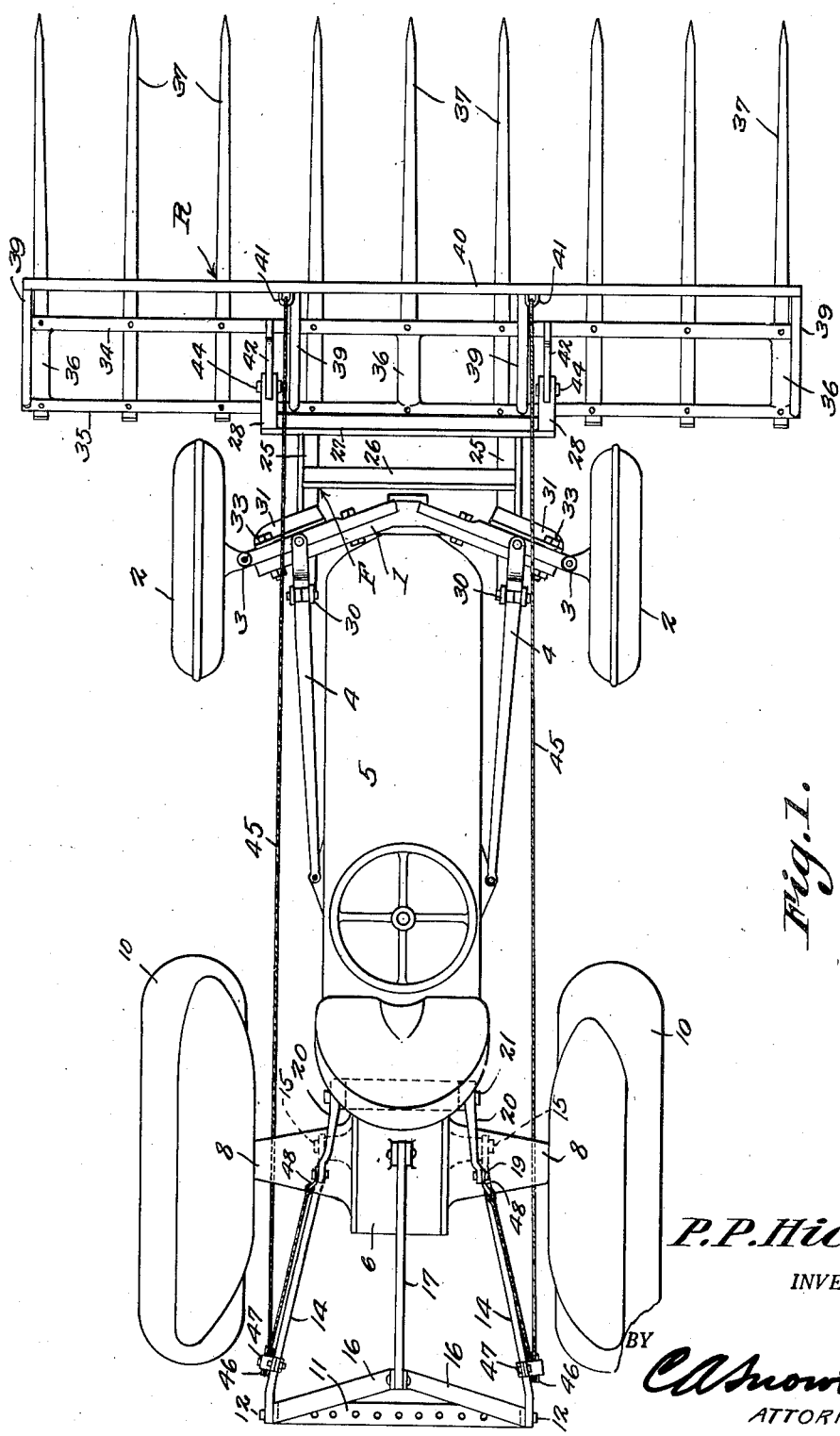

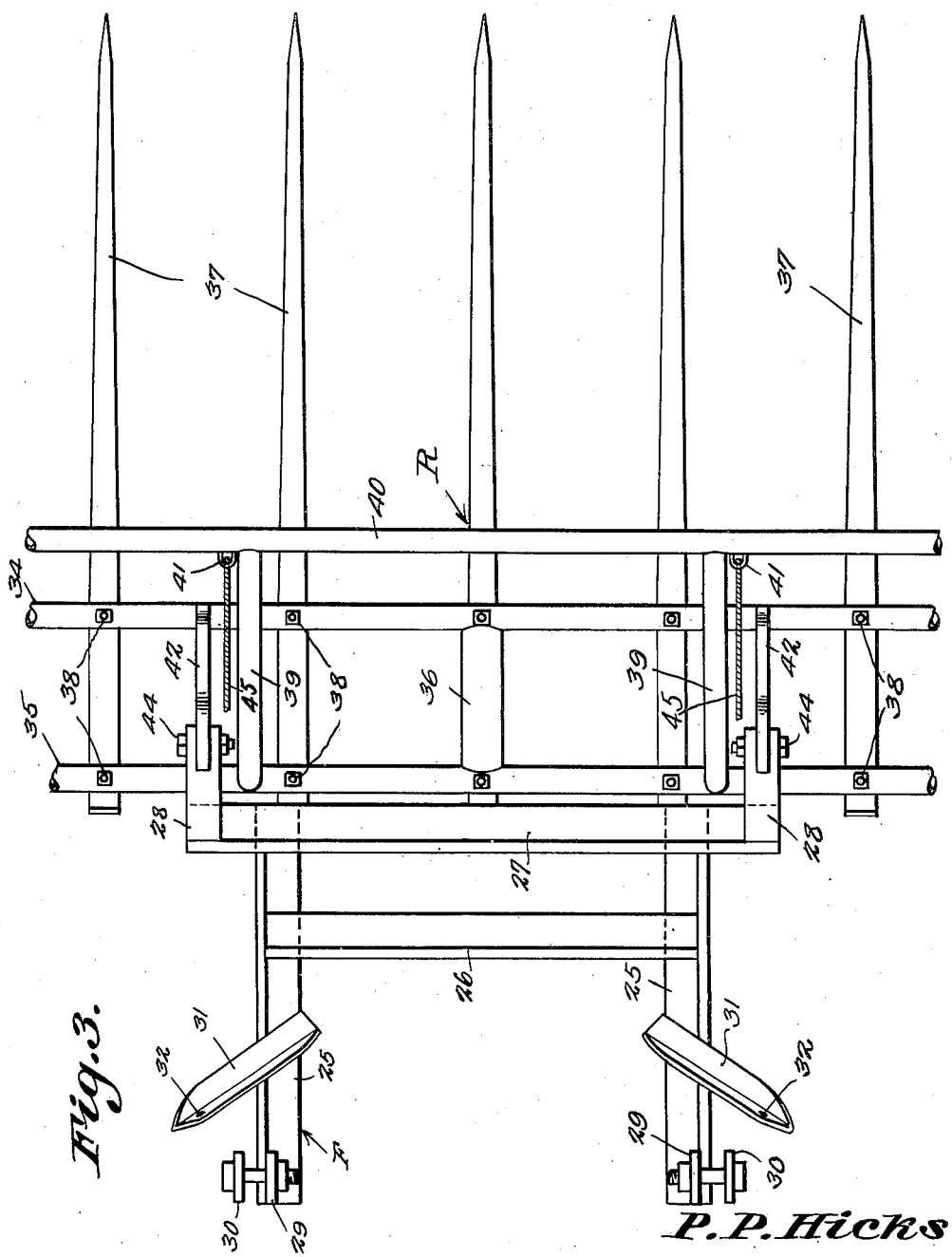

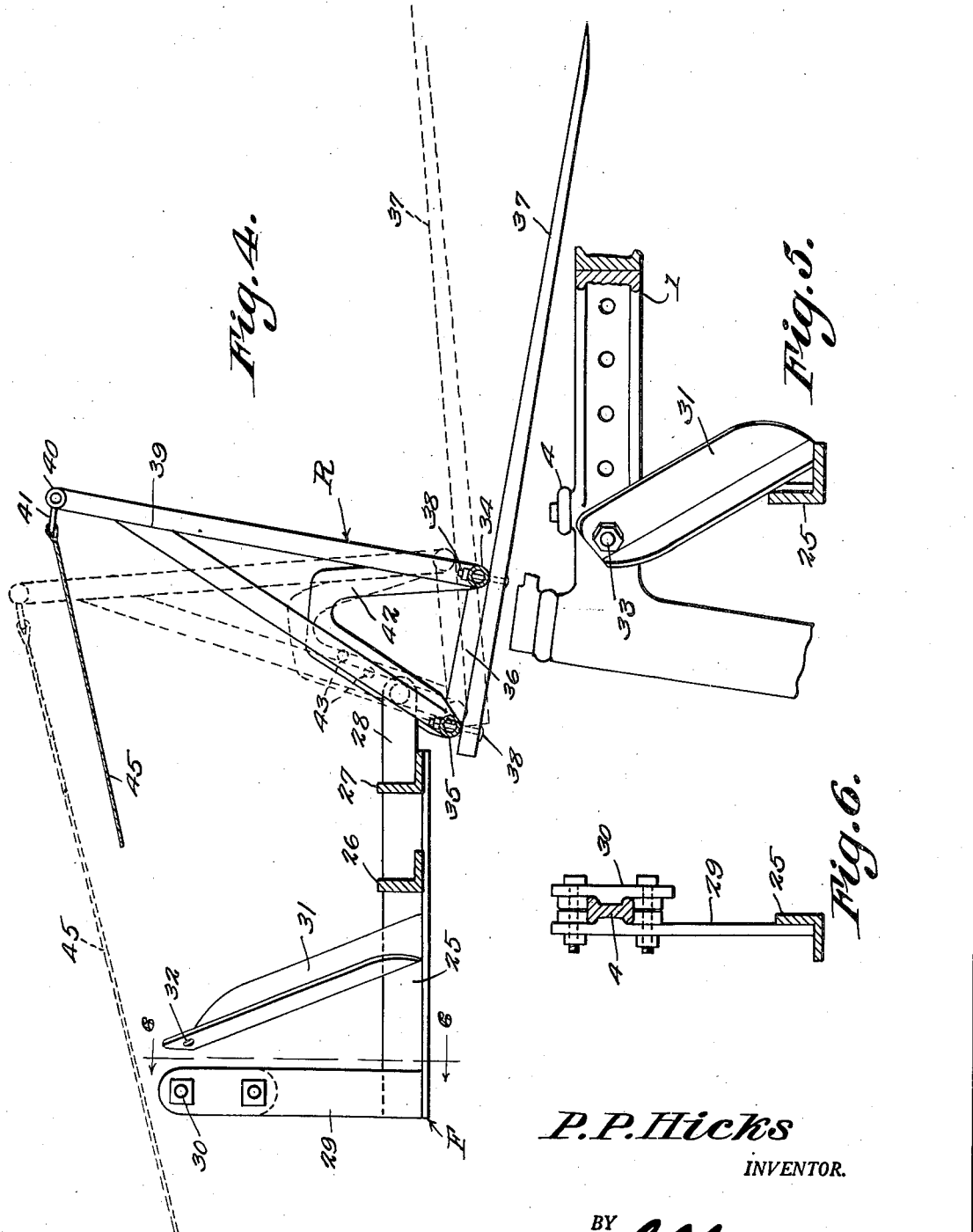

Patented Nov. 6, 1945

2,388,411

UNITED STATES PATENT OFFICE 2,388,411

TRACTOR RAKE

Paris P. Hicks, Jane Lew, W. Va., assignor of one-half to Michael Faulkner, Weston, W. Va.

Application November 29, 1943, Serial No. 512,201

1 Claim. (Cl. 56—27)

This invention has among its objects, the provision of novel means for mounting a collector, for example a rake, on the forward portion of a tractor, and to supply novel means for imparting upward and downward swinging movement to the collector.

A further object of the invention is to provide means whereby, if desired, the collector may be swung upward and downwardly through the instrumentality of the power lift of a tractor.

A further object of the invention is to provide novel means for guiding the flexible element which controls the collector, in such a way that the flexible element will pass above the forward axle of the tractor and beneath the rear axle thereof, clear of those parts.

Another object of the invention is to provide a frame carrying the collector, and so constructed that it may be assembled with the radius rods of the front axle of a tractor and with the axle thereof, without working changes either in the radius rods or in the axle.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows in top plan, a device constructed in accordance with the invention;

Fig. 2 is a side elevation, wherein parts are broken away;

Fig. 3 is a top plan of the collector and its supporting frame;

Fig. 4 is a vertical longitudinal section taken through the collector and its supporting frame;

Fig. 5 is a detailed sectional view showing the means whereby the frame is assembled with the forward axle of the tractor;

Fig. 6 is a section taken on line 6—6 of Fig. 4;

Fig. 7 is a section on the line 7—7 of Fig. 2.

The device forming the subject matter of this application may be used in combination with tractors of widely different sorts, but in Figs. 1 and 2 there is shown a tractor comprising a forward axle 1, to which forward wheels 2 are connected (Fig. 1) by knuckles 3. The forward ends of radius rods 4 are connected to the axle 1, the rear ends of the radius rods being mounted on the sides of an engine casing 5.

A differential housing is shown at 6, and includes a hollow extension 7, joined to the rear end of the engine casing 5, which broadly stated, may be considered as part of the tractor "body." The rear axle housings are shown at 8, and in them is located a rear axle 9, carrying rear wheels 10.

At the rear of the tractor is disposed a carrier C, to which may be connected soil-working instrumentalities (not shown). The carrier C comprises a transverse draft bar 11, which is connected at its ends, by pivot elements 12, with forwardly extended levers 14 of the third order, having their forward ends fulcrumed at 15 on lateral extensions of the differential housing 6.

The lower ends of upwardly extended, converging hangers 16 are mounted on the pivot elements 12. The numeral 17 marks a tie, having its forward end assembled with the differential housing 6, the rear end of the tie being pivotally connected with the upper ends of the hangers 16. So far as the present invention is concerned, the tie 17 forms means for sustaining the carrier C against sagging down, since it rests on the differential housing 6.

Rearwardly extended crank arms 20 are secured to a transverse shaft 21, mounted to rock on the extension 7 of the differential housing 6. The shaft 21 is supplied with a depending crank arm 22, whereunto is pivoted the rod of a power piston 23, mounted to reciprocate in a cylinder 24 in the part 7.

The device is adapted to be used in connection with a rake or collector R, to be described hereinafter.

It is with such a tractor, or with a similar one, that the collector structure and associated parts, next to be described are adapted to be used.

The letter F designates a frame, of any desired construction, and preferably L-shaped in side elevation, as shown in Fig. 2. The frame F includes longitudinal, parallel bottom bars 25, united intermediate their ends by a cross piece 26. The forward portions of the bottom bars 25 are connected by a transverse head 27 which, as shown in Fig. 3, extends outwardly beyond the bottom bars. The head 27 is supplied at its ends with forwardly presented, bifurcated arms 28.

Standards 29 are secured to the rear ends of the bottom bars 25 and carry, in their upper portions, bolt-actuated clamps or attaching devices 30, which grip the radius rods 4. Uprights 31 (Figs. 2 and 3) have their lower ends secured to the bottom bars 25, the uprights having a backward and outward slant, to conform to the axle 1. Near their upper ends, the uprights 31 are supplied with openings 32.

The openings 32 are adapted to receive securing elements, such as bolts 33, connecting the uprights to the axle 1. The clamps 30 (Fig. 6) connect the standards 29 to the radius rods 4. Thus, as Fig. 2 discloses, the frame F is disposed below the forward axle 1.

The rake or collector R includes a transverse forward rail 34 and a transverse rear rail 35 disposed parallel to the rail 34, the rails being united at intervals by rigid connections 36. Forwardly presented tines 37, or other gathering means, are connected to the rails 34 and 35 by securing elements 38.

The upstanding back of the rake R includes inverted, V-shaped members 39, having their lower ends secured to the rails 34 and 35. At their upper ends, the back-forming members 39 are joined to a transverse top bar 40, carrying rearwardly presented eyes 41.

Adjacent to the innermost back-forming members 39, the rails 34 and 35 are joined by inverted, V-shaped brackets 42, the rear portions of which are received in the bifurcated arms 28 on the head 27 of the frame F. Pivot bolts 44 (Fig. 3) connect the rear portions of the brackets 42 with the arms 28, and, thus, the rake or collector R is assembled with the frame F for vertical swinging movement at the will of an operator. The rear portions of the brackets 42 (Figs. 4 and 2) are supplied with vertically spaced openings 43, for the reception of the pivot elements 44, and thus, the rake R may be adjusted up and down, with respect to the surface of the soil, independently of the vertical swinging movement of the rake on the pivot elements 44.

To the eyes 44 on the back of the rake R are connected the forward ends of flexible elements 45, which extend backwardly above the forward axle 1, as Fig. 2 shows. The flexible elements 45 are prolonged backwardly, beneath the rear axle housings 8 and are extended upwardly and forwardly about direction-changing pulleys 46, mounted for rotation in loop-shaped hangers 47 (Fig. 7) secured to the levers or supports 14 of the carrier C, near the rear ends of those parts. The upper, forward ends of the flexible elements 45 are attached to connectors 48, pivotally mounted on the crank arms 20 of the shaft 21.

In practical operation, the piston 23 and the arm 22 impart rocking movement to the shaft 21, which carries the crank arms 20. The flexible elements 45, which are connected to the crank arms 20, pay back and forth over the pulleys 46, and the rake or collector R is swung on its pivotal mounting 44, to dispose the tines 37, or their equivalent, at adjusted angles with respect to the surface of the soil.

It is to be noted that the upstanding portion 39 of the collector is high enough so that the flexible element 45 can pass rearwardly, above the forward axle 1, in spaced relation thereto, the pulley 46 being low enough so that the flexible element can pass underneath the rear axle 9, in vertically spaced relation thereto. The openings 43 in the bracket 42, and the pivot bolt 44 constitute means for mounting the collector on the frame F, for vertical swinging movement about vertically spaced axes.

Although the power lift, represented by the piston 2 and connected parts, constitutes the preferred actuating means, some other instrumentality for operating the flexible elements 45 may be employed.

The device is simple in construction, and may be attached to and detached from a tractor quickly and without difficulty.

Having thus described the invention, what is claimed is:

In a gathering device, a vehicle comprising a body, a front axle carried by the body, ground wheels carried by the axle for rotation, radius rods having their forward ends connected to the axle, their rear ends being connected to the body, a frame including a substantially horizontal part located below the axle and extended forwardly and rearwardly with respect thereto, the frame including upwardly extended standards on the rear portion of the horizontal part of the frame and located to the rear of the axle, means for connecting the upper portions of the standards detachably to the radius rods, uprights having their lower ends secured in transversely-spaced relation to the horizontal part of the frame in advance of the axle, means for securing the upper ends of the uprights detachably to the axle, a collector pivoted to the forward portion of the substantially horizontal part of the frame for vertical swinging movement, and means for imparting vertical swinging movement to the collector.

PARIS P. HICKS.